United States Patent
Dal Bello et al.

(10) Patent No.: US 8,359,773 B2
(45) Date of Patent: Jan. 29, 2013

(54) SERIES OF SPORTS SHOES, SUCH AS SKI BOOTS, SNOWBOARD BOOTS OR SUCHLIKE, OF DIFFERENT SIZES, COMBINATION OF TWO OR MORE SERIES AND RELATIVE METHOD OF PRODUCTION

(75) Inventors: Rino Dal Bello, Asolo (IT); Carletto Battilana, Casella d'Asolo (IT)

(73) Assignee: Calzaturificio dal Bello SRL, Casella d'Asolo (TV) (IT)

( * ) Notice: Subject to any disclaimer, the term of this patent is extended or adjusted under 35 U.S.C. 154(b) by 1085 days.

(21) Appl. No.: 12/023,213

(22) Filed: Jan. 31, 2008

(65) Prior Publication Data

US 2008/0184597 A1  Aug. 7, 2008

(30) Foreign Application Priority Data

Feb. 2, 2007 (IT) .................................. 2007A0021

(51) Int. Cl.
*A43B 5/04* (2006.01)
(52) U.S. Cl. ............................ 36/117.6; 36/117.3; 36/97
(58) Field of Classification Search ...... 36/117.1–119.1, 36/97, 10

See application file for complete search history.

(56) References Cited

U.S. PATENT DOCUMENTS

| | | | |
|---|---|---|---|
| 3,640,003 A * | 2/1972 | Anderson | 36/117.6 |
| 3,852,896 A | 12/1974 | Pyzel et al. | |
| 3,987,533 A | 10/1976 | Sandgren | |
| 4,078,322 A | 3/1978 | Dalebout | |
| 4,083,128 A | 4/1978 | Rossman | |
| 4,141,570 A | 2/1979 | Sudmeier | |
| 4,177,584 A | 12/1979 | Beyl | |
| 4,245,409 A * | 1/1981 | Beyl | 280/613 |
| 4,408,779 A | 10/1983 | Shekter | |
| 5,071,154 A | 12/1991 | Szasz et al. | |
| 5,261,688 A | 11/1993 | Rohrmoser | |
| 5,273,305 A | 12/1993 | Erdei et al. | |
| 5,317,821 A * | 6/1994 | Vargo | 36/93 |
| 5,344,178 A | 9/1994 | Rohrmoser | |
| 5,498,017 A | 3/1996 | Rohrmoser | |

(Continued)

FOREIGN PATENT DOCUMENTS

DE 3602636 C1 4/1987
DE 3924240 A1 6/1990

(Continued)

OTHER PUBLICATIONS

Atomic Rental System, Brochure, Feb. 1, 2001, 3 pages.

(Continued)

*Primary Examiner* — Jila M Mohandesi
(74) *Attorney, Agent, or Firm* — Maine Cernota & Rardin

(57) ABSTRACT

Series, combination of series and method to produce sports shoes of different size, in which each sports shoe of different size comprises a casing substantially rigid and defining an internal compartment for containing the user's foot, a sole associated below the casing and an inner boot disposed in the internal compartment, in order to make putting the foot into the casing more comfortable. The sole has always the same length for all the sports shoes, and the casing has a different size to each other so as to define, on each occasion, an internal compartment with a different volume for each of the sports shoes of different size, so as to cover a plurality of foot sizes, within a determinate range, keeping the length of the sole always the same.

5 Claims, 1 Drawing Sheet

U.S. PATENT DOCUMENTS

| | | | |
|---|---|---|---|
| 5,575,496 | A | 11/1996 | Luitz et al. |
| 6,471,235 | B1 | 10/2002 | Luitz et al. |
| 6,779,810 | B1 | 8/2004 | Mangold |
| 6,877,256 | B2 * | 4/2005 | Martin et al. .............. 36/50.5 |
| 7,386,947 | B2 * | 6/2008 | Martin et al. .............. 36/117.6 |
| 7,428,789 | B2 * | 9/2008 | Holzer et al. .............. 36/88 |
| 7,784,814 | B2 * | 8/2010 | Brandt .............. 280/618 |
| 7,887,081 | B2 * | 2/2011 | Brandt .............. 280/617 |
| 2002/0092182 | A1 | 7/2002 | Coplon et al. |
| 2002/0113413 | A1 | 8/2002 | Sosin et al. |
| 2007/0145721 | A1 | 6/2007 | Brandt |

FOREIGN PATENT DOCUMENTS

| | | |
|---|---|---|
| DE | 19936519 A1 | 2/2001 |
| FR | 2460118 A1 | 1/1981 |
| GB | 1214738 | 12/1970 |
| JP | 2270519 A | 11/1990 |
| JP | 6284901 A | 10/1994 |
| WO | 92/06607 A1 | 4/1992 |
| WO | 96/13183 A1 | 5/1996 |
| WO | 02/47776 A2 | 6/2002 |
| WO | 2005053802 A1 | 6/2005 |

OTHER PUBLICATIONS

Oxygen 2002/03, Brochure, Feb. 2, 2002, 2 pages.
"Manual 2002/03", Brochure, Atomic, Feb. 2, 2002, 3 pages.
"Alpine Collection 2002/03", Brochure, Atomic, Feb. 2, 2002, 4 pages.
EP Search Report dated Sep. 3, 2007 of Patent Application No. UD20070021 filed Feb. 2, 2007.

* cited by examiner

SERIES OF SPORTS SHOES, SUCH AS SKI BOOTS, SNOWBOARD BOOTS OR SUCHLIKE, OF DIFFERENT SIZES, COMBINATION OF TWO OR MORE SERIES AND RELATIVE METHOD OF PRODUCTION

FIELD OF THE INVENTION

The present invention concerns a series of sports shoes of different sizes, such as for example ski boots, snowboard boots or suchlike, having at least a casing or upper, substantially rigid, and underneath a sole suitable to be associated with an attachment device, for example for a ski, a snowboard or other. In particular, the present invention concerns a series of sports shoes that allow to keep unvaried the opening adjustment of the ski attachment, inside a certain range of foot sizes of the boot, while still guaranteeing excellent wearability and functional efficiency of the boot.

BACKGROUND OF THE INVENTION

It is known that, particularly in commercial activities of renting footwear and other sporting equipment, such as ski boots and ski equipment, in order to accelerate delivery times and personalization of the material provided, there is a need to intervene as little as possible for the specific adjustment of the opening sizes of the attachment of the skis, with respect to the size of the boot.

For this reason, ski boots have been designed that comprise a rigid casing and sole in which, in order to adapt a fixed length of the sole, corresponding to an adjustment of the attachment, to a certain range of sizes, inner boots are used which have padding of different thicknesses.

The inner boots of known boots are inserted on each occasion into the casing in order to compensate, with the different thickness of their padding, the difference between the fixed internal size of the rigid casing and the specific size, and variable in said range, of the user's foot.

It is also known that, to cover substantially all the possible sizes, three or four series, different in size, of casings and soles of fixed length are made, into which an equal number of inner boots, padded with different thicknesses, are selectively inserted, so that each series of casings and soles of fixed length can be adapted to three or four different foot sizes.

However, with boots of these known series, with prolonged use, the padding of the inner boot progressively loses its consistency, especially in the case of rented inner boots, and therefore subjected to intensive use, until the user's foot is allowed to move excessively and uncontrollably inside the casing, and the necessary functional rigidity is not guaranteed.

This uncontrolled movement of the foot, when the sport is practiced, can also cause the risk of accidents, even very serious, and falls.

The risk of accidents due to the yielding of the inner boots is particularly increased if we consider that the market of ski boots and equipment for rent is mainly addressed to beginners or occasional users.

SUMMARY OF THE INVENTION

One purpose of an embodiment of the present invention is to achieve a series of sports shoes, such as ski boots, snowboard boots or suchlike, which is simple and economical to make and which overcomes the disadvantages of the state of the art.

Another purpose of the present invention is to perfect a method for making a series of sports shoes of different sizes having the sole of a fixed length.

In accordance with the above purposes, a series of sports shoes of different size according to one embodiment of the present invention provides a plurality of boots, each of which comprises a substantially rigid casing able to define an internal containing compartment for the user's foot, a sole associated below the casing, and an inner boot disposed in the internal compartment of the casing to make putting the boot on the foot more comfortable.

According to one embodiment of the present invention, the sole has always the same length for all the sports shoes, of different size, of the series, whereas the casing has a different size to each other so as to define, on each occasion, an internal compartment with a different volume for each sports shoe, of different size, of the series, so that the series according to such an embodiment of the invention can cover a plurality of foot sizes, inside a determinate range, keeping the length of the sole always the same.

The sports shoes of the series according to one embodiment of the invention are made in a molding step, by means of at least a molding equipment having a first part always the same for all the sports shoes, of different size, of the series, in which the sole with always the same length is made, and a second part, modified or modifiable in a front segment and/or a rear segment, for each sports shoe of the series, in which the casings of different size to each other are made with the respective internal compartments different for each sports shoe, of different size, of the series, so as to obtain different sizes of the casing.

With one embodiment of the present invention a series of sports shoes is therefore made, or a plurality of said series, each one defined by a specific length of sole, which has different casings, each of a discrete size and different from the other, so as to satisfy the different foot sizes of the users, whereas the length of the sole remains always unvaried for the whole series.

In this way, a possible attachment to relative skis or snowboards does not require specific opening adjustments of the attachments, according to the different foot sizes of the boots, inside the same series.

By the term "discrete size" we mean that the variation in size of the casing can vary so as to correspond to a variation by half a size, or a size, from each other.

Moreover, with one embodiment of the present invention, the only function of the inner boot is to make it more comfortable to put the foot in, and not to compensate, with the thickness of its padding, the difference in size between the size of the internal compartment of the casing and the user's foot.

In this way, it is the rigidity of the casing that guarantees that the correct positioning of the foot is maintained in the sports shoe, substantially with no risk that possible loosening of the padding of the inner boot can allow excessive or uncontrolled movements of the foot inside the casing.

Therefore, with one embodiment of the present invention, the risk of accidents and/or falls due to the loosening of the padding in the inner boot is reduced to a minimum, and the functionality and efficiency of the shoe is maintained unchanged.

It is clear that to cover the highest number of possible sizes, it may be provided to make a number of series of sports shoes according to one embodiment of the present invention as desired, for example four, each one having a specific sole length, and each one having different discrete sizes of the casings.

According to one embodiment, the mold equipment with which the series according to the present invention are made comprises a dedicated mold for each sports shoe, where the mold has its second part specifically shaped to define the internal volume of the relative casing.

According to another embodiment, the mold equipment with which the series according to the present invention are made comprises a single mold, selectively modifiable in its second part by inserting suitable inserts, thicknesses, shapes or other, into its front segment and/or rear segment, in order to define, on each occasion, the internal volume of the relative casing.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

These and other characteristics of the present invention will become apparent from the following description of a form of embodiment, given as a non-restrictive example with reference to the attached drawings wherein.

DETAILED DESCRIPTION

Figures 1, 2, 3, 4:
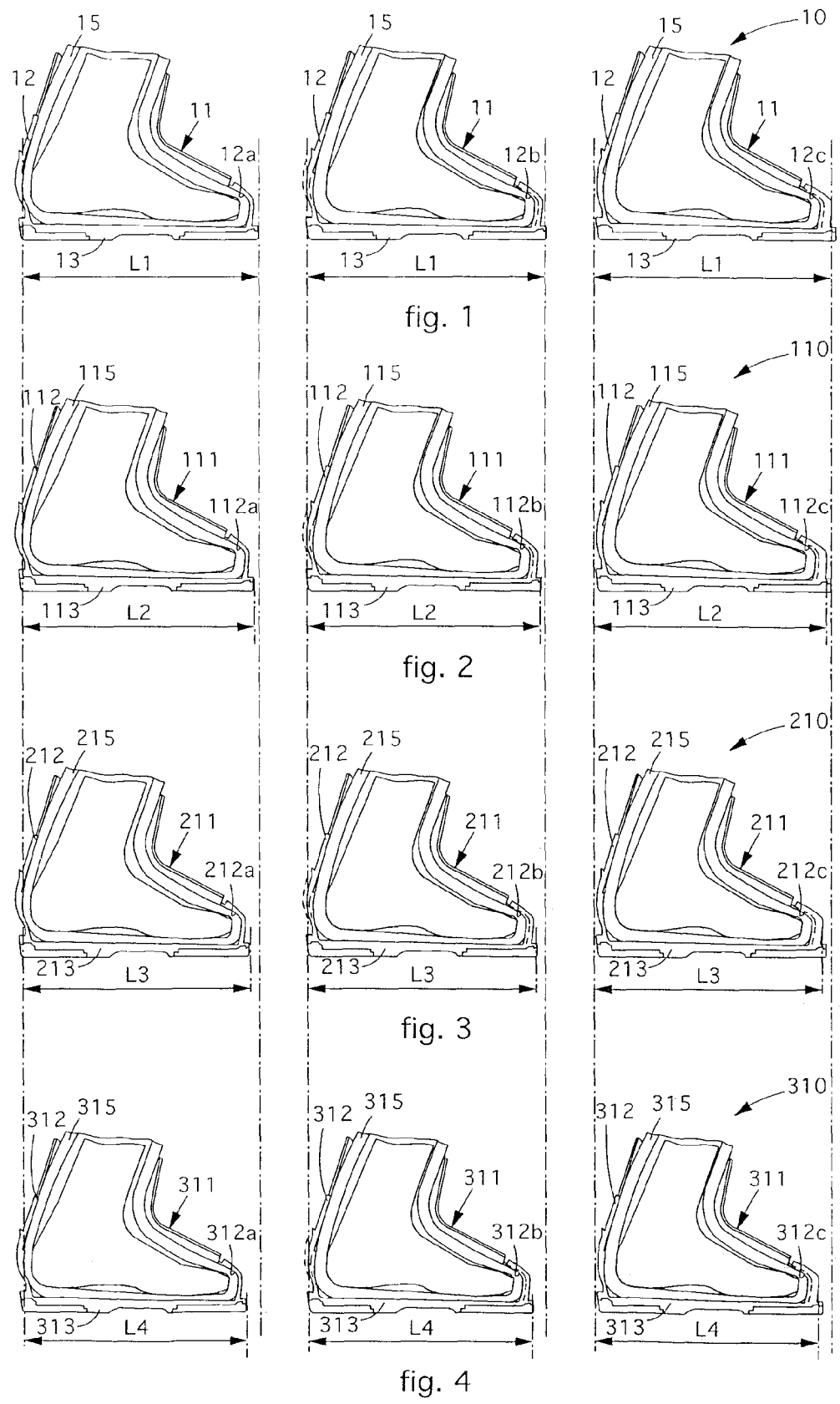
FIG. 1 is a schematic lateral view of a first series of sports shoes according to the present invention.
FIG. 2 is a schematic lateral view of a second series of sports shoes according to the present invention.
FIG. 3 is a schematic lateral view of a third series of sports shoes according to the present invention.
FIG. 4 is a schematic lateral view of a fourth series of sports shoes according to the present invention.

With reference to the attached drawings, four series, respectively a first 10 (FIG. 1), a second 110 (FIG. 2), a third 210 (FIG. 3) and a fourth 310 (FIG. 4) of sports shoes 11, 111, 211 and 311, of variable size, are shown schematically.

In general, in all the series 10, 110, 210 and 310 according to the present invention each ski boot 11, 111, 211 and 311 comprises a respective casing 12, 112, 212 and 312 of a different size for each series 10, 110, 210 and 310 and with which a sole 13, 113, 213 and 313 is associated underneath, of a fixed length for each series 10, 110, 210 and 310. Moreover, each ski boot 11, 111, 211 and 311 comprises inside it an inner boot 15, 115, 215 and 315, able only to make the ski boot 11, 111, 211 and 311 more comfortable for the user to put on and wear.

With particular reference to FIG. 1, a first series 10 is shown in which the boots 11 all have a sole 13 of fixed length L1, for example comprised between about 285 mm and about 290 mm, advantageously 288 mm.

In this first series 10, on three soles 13 of equal length, three respective distinct casings 12 are provided, each shaped in a different way from the others, so as to define respective three internal compartments 12a, 12b and 12c, of a different size, variable in a discrete manner (half a size, a size or a desired fraction of a size), into which the specific inner boot 15 is inserted.

In this case, the internal compartment 12a has a usable internal length of about 235 mm, that is, about size 36 or 36½ European, the internal compartment 12b has a usable internal length of about 245 mm, that is, about size 37½, 38, while the internal compartment 12c has a usable internal length of about 255 mm, that is, about size 39, 39½.

With particular reference to FIG. 2, a second series 110 is shown in which the boots 111 all have a sole 113 with a fixed length L2, for example comprised between about 315 mm and about 320 mm, advantageously 318 mm.

In this second series 110, on three soles 113 of equal length, three respective distinct casings 112 are provided, each shaped in a different way from the others, so as to define respective three internal compartments 112a, 112b and 112c, variable in a discrete manner, of a different size, into which the specific inner boot 115 is inserted.

In this case, the internal compartment 112a has a usable internal length of about 265 mm, that is, about size 40, 41, the internal compartment 112b has a usable internal length of about 275 mm, that is, about size 42, 42½, while the internal compartment 112c has a usable internal length of about 285 mm, that is, about size 43, 44.

With particular reference to FIG. 3, a third series 210 is shown in which the boots 211 all have a sole 213 with a fixed length L3, for example comprised between about 340 mm and about 350 mm, advantageously 348 mm.

In this third series 210, on three soles 213 of equal length, three respective distinct casings 212 are provided, each shaped in a different way from the others, so as to define respective three internal compartments 212a, 212b and 212c, variable in a discrete manner, of a different size, into which the specific inner boot 215 is inserted.

In this case, the internal compartment 212a has a usable internal length of about 295 mm, that is, about size 45, 45½, the internal compartment 212b has a usable internal length of about 305 mm, that is, about size 46½, 47, while the internal compartment 212c has a usable internal length of about 315 mm, that is, about size 48, 48½.

With particular reference to FIG. 4, a fourth series 310 is shown in which the boots 311 all have a sole 313 with a fixed length L4, for example comprised between about 375 mm and about 380 mm, advantageously 378 mm.

In this fourth series 310, on three soles 313 of equal length, three respective distinct casings 312 are provided, each shaped in a different way from the others, so as to define respective three internal compartments 312a, 312b and 312c, variable in a discrete manner, of a different size, into which the specific inner boot 315 is inserted.

In this case, the internal compartment 312a has a usable internal length of about 325 mm, that is, about size 49, 49½, the internal compartment 312b has a usable internal length of about 335 mm, that is, about size 50, 50½, while the internal compartment 312c has a usable internal length of about 345 mm, that is, about size 51, 51½.

In this way, by combining together the four series 10, 110, 210 and 310 made according to one embodiment of the present invention, it is possible to cover, with only four different lengths L1, L2, L3 and L4 of soles 13, 113, 213 and 313, a number of foot sizes that goes from 36 to 51½.

The boots 11, 111, 211 and 311 of each of the series 10, 110, 210 and 310 described above are made by pressure die-casting of polymer material.

In one embodiment, the molding equipment, not shown, has a first part substantially the same for all the boots 11, 111, 211 and 311 of the same series 10, 110, 210 and 310 and has pre-determined size. In this first part the sole 13, 113, 213 and 313 of each ski boot 11, 111, 211 and 311 is made.

In this embodiment, the molding equipment also comprises a second part, modified or selectively modifiable in a front segment and/or in a rear segment thereof, for each boot

11, 111, 211 and 311 of the same series 10, 110, 210 and 310 so as to make different casings 12, 112, 212 and 312 for each series 10, 110, 210 and 310.

As shown schematically by a line of dashes in the attached drawings, the variation in thickness and/or inclination of the tip of the casing 12, 112, 212 and 312 and/or the variation in thickness and/or inclination in the heel part of the same determines the discrete variation of the relative internal volume 12a, 12b, 12c; 112a, 112b, 112c; 212a, 212b, 212c; 312a, 312b, 312c, of the casings 12, 112, 212 and 312 and hence of the foot size of the boot 11, 111, 211 and 311.

According to an alternative embodiment, a specific mold is made for each boot 11, 111, 211 and 311 to be made. In this embodiment, the second part is shaped specifically to define the relative internal volume 12a, 12b, 12c; 112a, 112b, 112c; 212a, 212b, 212c; 312a, 312b, 312c, of the casings 12, 112, 212 and 312.

According to another alternative embodiment, a single mold is made, at least one for each series 10, 110, 210 and 310. In this solution, the second part of the mold is selectively modifiable by suitably positioning inserts, thicknesses, blocks or other, in the front segment and/or rear segment of the mold, so as to define, on each occasion, a desired internal volume 12a, 12b, 12c; 112a, 112b, 112c; 212a, 212b, 212c; 312a, 312b, 312c, of the casings 12, 112, 212 and 312.

In this way, whether distinct molds are used for every boot 11, 111, 211 and 311, or whether the same modifiable mold is used for each series 10, 110, 210 and 310, we have the advantage of being able to provide the common production of at least a part of the mold for all the boots 11, 111, 211 and 311 of the same series 10, 110, 210 and 310.

It is clear, however, that modifications and/or additions of parts may be made to the series 10, 110, 210 and 310 as described heretofore, without departing from the field and scope of the present invention.

For example, it comes within the field of the present invention to provide that there is a different number of series 10, 110, 210 and 310 other than four, and also that each series 10, 110, 210 and 310 provides a different number of boots 11, 111, 211 and 311, other than three, between one series and the other. For example, it comes within the field of the present invention to provide a combination of five series of sports shoes, in which the first series comprises two boots, the second series comprises four boots, the third series comprises three boots and the fourth and fifth series each comprises two boots of different sizes.

It is also clear that, although the present invention has been described with reference to specific examples, a person of skill in the art shall certainly be able to achieve many other equivalent forms of series of sports shoes, such as ski boots, snowboard boots or suchlike, of different sizes, and relative production method, having the characteristics as set forth in the claims and hence all coming within the field of protection defined thereby.

The invention claimed is:

1. Combination of two or more series of sports shoes of different size, wherein each of said sports shoes comprises a casing substantially rigid and able to define an internal compartment for containing the user's foot, a sole associated below said casing and an inner boot disposed in said internal compartment, in order to make putting the foot into said casing more comfortable, wherein in each of said series said sole and said casing together comprise a single integrated molded body, and said sole has always the same length, longer than said casing, for all said sports shoes of different size, and said casing has a part modified in a front segment or a rear segment with respect to said casing of a shoe of the same series, to provide a variation in thickness or inclination of the tip of the casing or a variation in thickness or inclination in the heel part of the casing, a different size to each other so as to define, on each occasion, an internal compartment with a different volume varying in a discrete way, for each of said sports shoes of different size, so as to cover a plurality of foot sizes, within a determinate range, keeping the length of said sole always the same.

2. The combination as in claim 1, comprising four series each comprising three sports shoes of different size, wherein a first series comprises three sports shoes of different size having a sole with always the same length (L1) comprised between about 285 mm and about 290 mm for all three sports shoes, and three respective casings defining respectively a first internal compartment for a first sports shoe with a usable internal length equal to about 235 mm, a second internal compartment for a second sports shoe having a usable internal length equal to about 245 mm, and a third internal compartment for a third sports shoe having a usable internal length equal to about 255 mm, a second series comprises three sports shoes having a sole with always the same length (L2) comprised between about 315 mm and about 320 mm for all three sports shoes, and three respective casings defining respectively a first internal compartment for a first sports shoe with a usable internal length equal to about 265 mm, a second internal compartment for a second sports shoe having a usable internal length equal to about 275 mm, and a third internal compartment for a third sports shoe having a usable internal length equal to about 285 mm, a third series comprises three sports shoes having a sole with always the same length (L3) comprised between about 340 mm and about 350 mm for all three sports shoes, and three respective casings defining respectively a first internal compartment for a first sports shoe with a usable internal length equal to about 295 mm, a second internal compartment for a second sports shoe having a usable internal length equal to about 305 mm, and a third internal compartment for a third sports shoe having a usable internal length equal to about 315 mm, and a fourth series comprises three sports shoes having a sole with always the same length (L4) comprised between about 375 mm and about 380 mm for all three sports shoes, and three respective casings defining respectively a first internal compartment for a first sports shoe with a usable internal length equal to about 325 mm, a second internal compartment for a second sports shoe having a usable internal length equal to about 335 mm, and a third internal compartment for a third sports shoe having a usable internal length equal to about 345 mm.

3. Method to make a series of sports shoes of different size, wherein each of said sports shoes comprises a casing substantially rigid and able to define an internal compartment for containing the user's foot, a sole associated below said casing and an inner boot disposed in said internal compartment, in order to make putting the foot into said casing more comfortable, the method comprising at least a molding step in which each of said sports shoes of different size is made, by means of at least a mold equipment having a first part always the same for all said sports shoes of different size, in which said sole of always the same length (L1, L2, L3, L4) is made, and a second part, modified or modifiable in a front segment and/or in a rear segment thereof, in which said casings of different size to each other are made, defining on each occasion respective internal compartments with a different volume for each sports shoe of different size, so as to obtain a plurality of foot sizes, within a determinate range, keeping the length of said sole always the same.

4. The method as in claim 3, wherein said mold equipment comprises a dedicated mold for each of said sports shoes of different size, and wherein said mold has said second part specifically shaped to define the volume of the internal compartment of the relative casing.

5. The method as in claim 3, wherein said mold equipment comprises a single mold selectively modifiable in said second part by the insertion of suitable inserts, thicknesses, shapes or other, into the front segment and/or the rear segment thereof, so as to define on each occasion the volume of the internal compartment of the relative casing.

* * * * *